(12) United States Patent
Kiene et al.

(10) Patent No.: US 8,903,358 B2
(45) Date of Patent: Dec. 2, 2014

(54) MOBILE SERVICE PRIMARY SUBSCRIBER WITH SECONDARY SUBSCRIBERS

(71) Applicants: Stefan Kiene, Sachsenheim (DE); Dennis Landscheidt, Mannheim (DE)

(72) Inventors: Stefan Kiene, Sachsenheim (DE); Dennis Landscheidt, Mannheim (DE)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 13/716,993

(22) Filed: Dec. 17, 2012

(65) Prior Publication Data

US 2014/0171022 A1 Jun. 19, 2014

(51) Int. Cl.
*H04M 11/00* (2006.01)
*H04W 4/26* (2009.01)

(52) U.S. Cl.
CPC .................................... *H04W 4/26* (2013.01)
USPC .......... 455/408; 455/414.1; 455/409; 705/40; 725/8; 379/114.01

(58) Field of Classification Search
CPC . G06Q 20/102; G06Q 30/04; G06Q 30/0601; G06Q 30/00; G06Q 20/401; G06Q 20/28; G06Q 30/0283; G06Q 20/16; H04M 17/00; H04M 2215/0152; H04M 15/772
USPC .............. 455/466, 414.1, 406–409; 379/114.1–132; 705/40; 725/1–8
See application file for complete search history.

(56) References Cited

U.S. PATENT DOCUMENTS 7,761,337 B2 * 7/2010 Caballero et al. ............ 705/26.4
2013/0035993 A1 * 2/2013 Hungate ....................... 705/14.1

* cited by examiner

*Primary Examiner* — Quan M Hua
(74) *Attorney, Agent, or Firm* — Schwegman Lundberg & Woessner, P.A.

(57) ABSTRACT

Various embodiments illustrated and described herein include at least one of systems, software, and methods to perform one or more tasks such as quoting wireless service plans, receiving wireless service orders, generating wireless service contracts, and effectuating these contracts in a wireless service network. In particular, such embodiments provide mechanisms through which a primary subscriber is allowed to choose wireless services for a primary subscriber and one or more secondary subscribers with differing and customizable service levels while having a single rate-plan, which may be pre-paid, post-paid, or a combination thereof. These embodiments are facilitated by an application that allows for defining and capturing of one rate plan that covers wireless services for a plurality of subscribers each having different pre-paid or post-paid accounts with an ability for each subscriber to have differing services and service levels.

14 Claims, 6 Drawing Sheets

WIRELESS SERVICE QUOTATION FOR SYLVESTER MILLER

MOBILE SERVICE FAMILY PLAN
SHARED FREE MINUTES/MONTH: 100 (5€) / 200 (7€)
INCLUDED DATA/MONTH: 1 GB (4€) / 2GB (8€)
INCLUDED SMS/MONTH: 250 (3€) / UNLIMITED (5€)

| MEMBER ID | Name | Main Account | Backup Account for | Backup Account | Tel. Number | Personal Config? | Free Minutes |
|---|---|---|---|---|---|---|---|
| 100078 | S. Miller | - | - | - | 015134567 | ☐ | 2GB (8€/Month) ▼ |
| 100079 | P. Miller | 78 | Voice (always) SMS (never) Data (after 2pm) | 78 | 015134568 | ☐ | 2GB (8€/Month) ▼ |
| 100081 | W. Miller | 78 | ALL | 78 | 015134570 | ☑ | 1GB (4€/Month) ▼ |

[CHANGE BASE PLAN]  [ACCEPT]  [CANCEL]  [ADD SUBSCRIBER]  [REMOVE SUBSCRIBER]

*FIG. 2*

MOBILE SERVICE PRIMARY SUBSCRIBER WITH SECONDARY SUBSCRIBERS

BACKGROUND INFORMATION

In wireless service markets, wireless service providers receiving many new subscribers on a daily level, some more than one million per month. While in many markets, new wireless service subscribers are primarily for post-paid accounts, many markets are predominantly pre-paid accounts. At the same time, wireless subscribers increasingly desire greater flexibility from wireless service providers in setting up their accounts. In particular, wireless service subscribers often desire family accounts with flexiblity for managing subscriptions for their children.

BRIEF DESCRIPTION OF THE DRAWINGS

FIG. 2 is a user interface illustration, according to an example embodiment.

DETAILED DESCRIPTION

Figure 1:
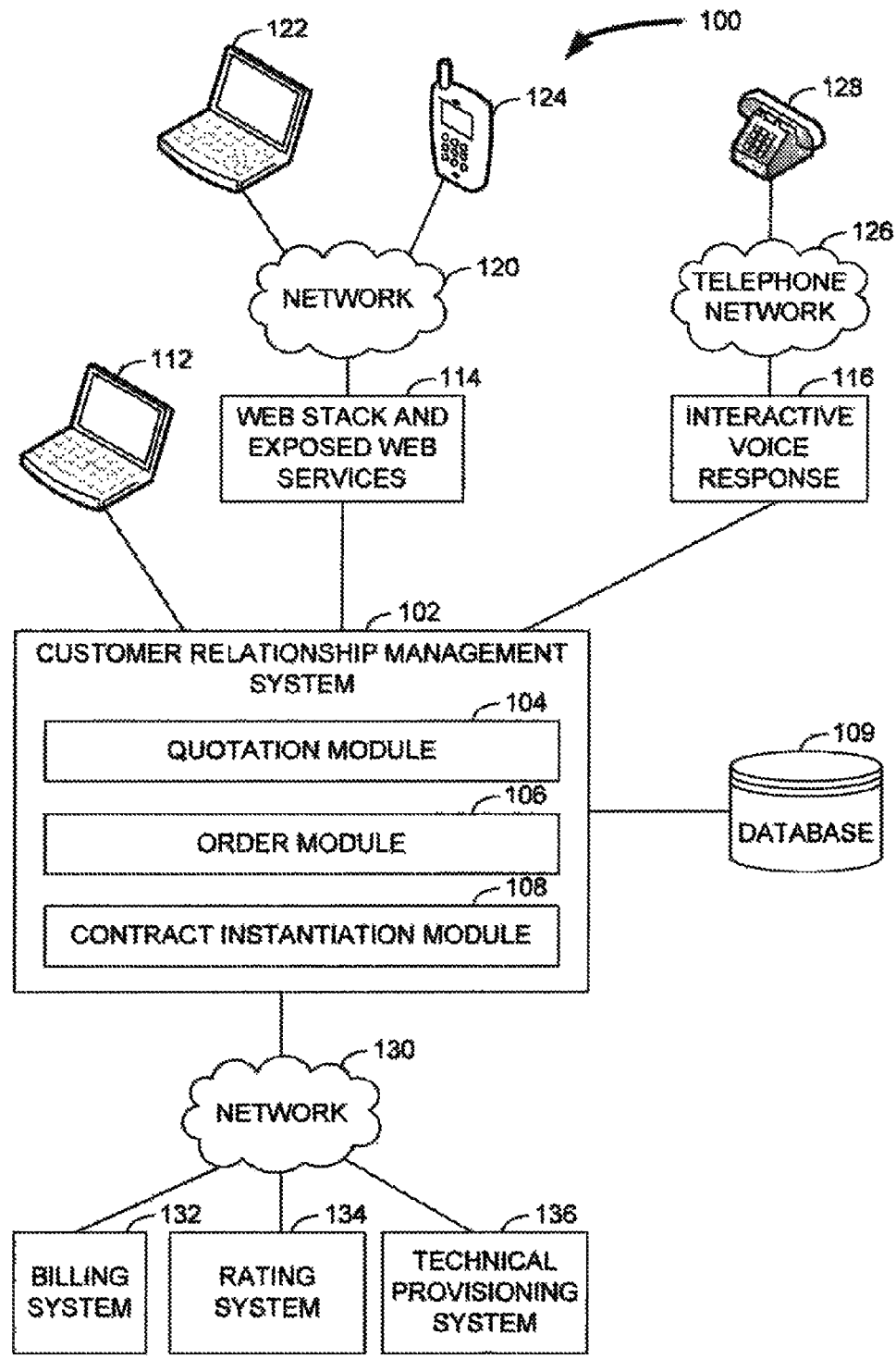
FIG. 1 is a logical illustration of a system, according to an example embodiment.

Various embodiments illustrated and described herein include at least one of systems, software, and methods to perform one or more tasks such as quoting wireless service plans, receiving wireless service orders, generating wireless service contracts, and effectuating these contracts in a wireless service network. In particular, such embodiments provide mechanisms through which a primary subscriber is allowed to choose wireless services for a primary subscriber and one or more secondary subscribers with differing and customizable service levels while having a single rate-plan, which may be pre-paid, post-paid, or a combination thereof. These embodiments are facilitated by an application that allows for defining and capturing of one rate plan that covers wireless services for a plurality of subscribers each having different pre-paid or post-paid accounts with an ability for each subscriber to have differing services and service levels. Once the data is captured and an order generated, a contract is generated and data is populated to each of a billing system, a rating system, and a technical provisioning system. In some embodiments, the contract is populated to the billing system as a single contract having multiple subscribers associated therewith, to the rating system as individual contracts for each subscriber, and to the technical provisioning system to enable subscriber mobile devices according to their subscribed services and service levels thereof. These and other embodiments are described in further detail below with reference to the drawings.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical illustration of a system 100, according to an example embodiment. The system 100 is an example of a system and related elements within which some embodiments may be implemented to provide flexiblity to wireless service customers in defining how their accounts will be setup not only for themselves as primary subscribers, but also for other secondary subscribers, such as a spouse, child, employee, friend, and others. The system 100 as illustrated includes a customer relationship management system 102 within which many data processing activities of the system 100 occur. Such a customer relationship management (CRM) system may be one of the various CRM systems offered by SAP AG of Walldorf, Germany or other competing products. However, in other embodiments, the CRM system 102 may be replaced by another software system enabled to provide functionality as described herein.

The CRM system 102 includes a customer data stored in a database 109 along with other data relevant to such a CRM system 102 as well as data generated and utilized in the various embodiments described herein. The CRM system 201 further includes a quotation module 104, an order module 106, and a contract instantiation module 108.

The quotation module 104 is executable by at least one processor of at least one computing device on which the CRM system 102 operates to receive data from an actual or perspective primary subscriber with regard to wireless services and service levels of the primary subscriber and one or more secondary subscribers. The data may be received into the quotation module 104 either directly or indirectly. In some embodiments, the data may be received directly by the quotation module 104 from the primary subscriber, such as through a browser-based interface accessed via a network 120 (i.e., the Internet) by the primary subscriber via a personal computer 122 or mobile device 124, through a mobile device 124 or personal computer 122 app, or through a telephone 128 over a telephone network 126 via an interactive voice response system 116. In some embodiments, the data may be received indirectly by the quotation module 104 from the primary subscriber via a computer terminal 112 utilized by a telephone salesperson. Regardless of how the data is received into the quotation module 104, various embodiments may include different avenues through which a primary subscriber may communicate with the quotation module 104.

In some embodiments where the primary subscriber interacts with the CRM system 102 and the quotation module 104 via a web browser or mobile device 124 app, a web stack 114 is included. The web stack 114 generally includes component data processing entities such as a web server and an application server that exposes data and services, such as web services, of the CRM system 102 and one or more of the modules 104, 106, 108 therein to the network 120, such as the Internet. In some embodiments, where the primary subscriber interacts with the CRM system 102 and the quotation module via a telephone 128, an interactive voice response system 116 is included. The interactive voice response system 116 is connected to the CRM system 102 and to a telephone network 126 over which a primary subscriber, as a caller via a telephone 128, can interact with the CRM system 102 and the one or more of the modules 104, 106, 108 therein. The interactive voice response system 116 generally communicates with the CRM system 102 and the one or more modules 104, 106, 108 thereof to provide abilities for a primary subscriber to select wireless services and service levels thereof for each of the primary subscriber and one or more secondary subscribers.

Regardless of how the primary subscriber connects to and interacts with the CRM system 102 and quotation module 104, the quotation module 104 may first generally collect account related data from the primary subscriber, such as name, address, credit related information, employer and salary information, and the like. In some embodiments, the quotation module 104 may then request and collect information about a number of secondary subscribers to be associated with an account of the primary subscriber. For example, the primary subscriber may wish for a spouse and a child to be associated with the account of the primary subscriber as secondary subscribers. Note that the primary subscriber and secondary subscriber need not be of familial relation in all embodiments, although a wireless service provider, in some instances, may require such a relation in their own sales policies. Information with regard to the secondary subscribers may generally include name, address, and the like.

The quotation module 104 may then present account-type (i.e., pre-paid or post-paid) and service and service level options with regard to the primary subscribers and all secondary subscribers. For example, the primary subscriber may choose to have a single post-paid account-type that covers the primary subscriber and all secondary subscribers. In another instance, a primary subscriber may choose to have a post-paid account-type and to fund one or more of the secondary accounts by a certain value every month. The amounts funded to the pre-paid account-types may be set to be prefunded by the primary subscriber or have the pre-paid value credited to the secondary accounts every month, although the prefunded value is billed to the primary subscriber on a post-paid basis. In other instances, the post-paid and pre-paid account status for each of the primary subscribers may be mixed and matched in virtually limitless combinations, each having the same or different amounts credited to them when they are pre-paid accounts. Further, even when a post-paid account-type is specified for the primary of secondary subscribers, a credit limit may be set by the primary subscriber to limit a value amount of services consumed within a period. However, billing for the primary subscriber and the secondary subscribers is to all be billed to the primary subscriber.

In some embodiments, the primary subscriber may then be provided wireless service and service level options. The wireless services may include one or a combination of voice, data, Simple Message Service (SMS)/Multi-media Message Service (MMS), mobile television, and other such services that may be provided via a network of a wireless service provider. The primary subscriber may be presented with predefined service options that include bundled services and service levels for each subscriber individually or combined and shared. In addition, or alternatively, a la carte service and service level options may be presented to the primary subscriber with regard to all or individual subscribers. For example, the primary subscriber may choose a shared family plan of unlimited voice and two gigabytes of data service shared amongst all subscribers. The primary subscriber may then choose an SMS service level a la carte for one of the secondary subscribers of 500 messages per month. In another example, the primary subscriber may choose individual plans for each of the primary subscriber and the secondary subscribers. Again, there are virtually limitless combinations of service and service levels that may be presented and chosen. Note however, that depending on the account-type (pre-paid or post-paid) of the account as a whole or the individual primary and secondary subscribers, the plan and a la carte services offered may vary.

Another option provided to a primary subscriber when setting up wireless services for the primary subscriber and one or more secondary subscribers is wireless service backup accounts. While the primary subscriber sets up wireless services, the services will generally be set up to be billed as one account. However, each of the primary subscriber and secondary subscribers may have their own logical accounts for purposes of assigned services, pre-paid account balances, and a post-paid account credit limit. With this in mind, the primary subscriber may designate one or more logical subscriber accounts as a backup account for another logical subscriber account. For example, a secondary subscriber may have SMS services enabled with a service level of 250 SMS messages per month. At the same time, the primary subscriber may have SMS services enabled with a service level of 500 SMS messages per month. The primary subscriber SMS service level may be designated as a backup for the secondary subscriber SMS service level, meaning that if the secondary subscriber SMS service level of 250 messages is met, rather than cutting off the SMS service or charging SMS service level usage overage for the secondary subscriber, overage usage by the secondary subscriber will be allowed at least until the SMS usage level of the primary subscriber is reached. Services other than SMS services may also be set, such as for voice, data, and other wireless services that may be offered by a particular wireless service provider.

Similarly, backup accounts may be used for pre-paid account balances held by a particular subscriber for one or more other subscribers. For example, the primary subscriber may have a prepaid account balance of $100.00. A secondary account can be configured to utilize the primary subscriber's prepaid account balance when the secondary subscriber's pre-paid account balance reaches $0.00.

Rules with regard to backup accounts may be relatively simple, such as to consume the service level or monetary balance of another subscriber when a service level or monetary balance reaches zero. However, some embodiments allow for rules that are more complex. For example, consider a case where a parent is the primary subscriber and a child is a secondary subscriber. The parent provides a month pre-paid account balance to the child as a secondary subscriber without limits on voice, data, or SMS usage. However, when the pre-paid account balance reaches zero, the parent primary subscriber may not want the child secondary subscriber usage to be completely turned off as the parent may want the child to be able to place voice calls and send SMS messages to the parent and possible others, such as a second parent, a grandparent, aunt, and babysitter. Thus, a more complex backup rule may be provided by the primary subscriber that allows conditional backup account usage that meet certain criterion. Such criterion may limit backup account usage to only certain services, certain numbers, be time restricted to certain times of day (i.e., after a time that school lets out for the day—2:30 P.M.), and the like.

At the same time, some embodiments may utilize such rules with regard to a secondary subscriber to allow a primary subscriber to limit all usage of a mobile device. For example, such rules may be specified by a primary subscriber to prevent usage of some or all wireless services but for certain time of the day, to certain numbers, and the like. Such rules can be applied in an instance where a parent as a primary subscriber wants to provide a wireless device to a child as a secondary subscriber with services limited to communicating only with certain others as defined by telephone numbers or other identifiers.

Some further embodiments also allow a primary subscriber to delegate configuration permissions. For example, the primary subscriber may be presented with options to allow each secondary subscriber to personally modify their own configuration. A setting may be enabled or disable with regard to each secondary subscriber. In some other embodiments, a single setting may enable or disable all secondary subscribers from modifying their own configurations. Additionally, a primary subscriber may also, or alternatively, be presented with an option to delegate primary subscriber configuration permissions, such as to a spouse.

Through such embodiments, the primary subscriber is able to flexibly define wireless services, wireless service levels, usage restrictions, and financial characteristics of wireless services for all members of a group including the primary subscriber and one or more secondary subscribers. However, despite the general flexibility in such embodiments, the primary subscriber's choice of a base plan or a la carte services and service levels thereof for use by the primary subscriber may limit the flexibility with regard to the secondary subscribers. For example, in some such embodiments, flexibility in defining wireless services, wireless service levels, usage restrictions, and financial characteristics of wireless services is an added feature that may be available with only select base plans, service levels, an added service charge, and the like.

Once such information is received by the quotation module 104, the quotation module may then provide a summary of the received information to the primary subscriber. The summary will also typically include a price quotation. The price summary may also provide additional options, such as an option to choose new wireless devices for one or more of the primary and secondary subscribers, to input with regard to wireless device already owned, to select telephone numbers, and other such options. The primary subscriber may also be presented with an option to return to modify the wireless services, wireless service levels, and secondary subscribers. Once the primary and secondary subscriber information, wireless services and wireless service levels, other options, and price quotation are acceptable to the primary subscriber, the primary subscriber may provide input to submit an order in accordance therewith. The order input will be received in the quotation module 104, which will cause a representation of the data to be stored in the database 109 and provided to the order module 106. The order module 106 will then process quotation data to generate and effectuate the order.

The order module 106, upon receipt of quotation data from which to generate an order, generates a contract data structure. The contract data structure is generally a single data structure, although in some embodiments, contract data may be stored in more than a single database record. Regardless of how contract data is stored, a single contract data structure is generated that includes data representative of the primary subscriber and each of the secondary subscribers. The single contract data structure also includes a cost from the cost quotation and costs associated with overage charges (i.e., a cost per minute of voice service usage over a contracted amount, cost per SMS message over a contracted amount, etc.), and other related data. Such other related data also typically includes post-paid and pre-paid designations with regard to the account as a whole or with regard to each of the primary and secondary subscribers, and with regard to each of the primary and secondary subscribers, services and service levels of each service, any overage rules, and service and service usage restriction rules. The contract data structure is then stored in the database 109 as the contract has been generated. A copy of the contract may then be sent to the primary subscriber in or more forms, such as print through a postal service, electronically through a web page or an email, and other modes of delivery. A representation of the contract may also be stored in or otherwise be accessible via an online repository that is accessible to at least the primary subscriber via a website over a network 120, such as the Internet.

Once the contract has been stored, the order module 106 will then trigger instantiation of the contract via the contract instantiation module 108. The contract instantiation module 108 operates to enable wireless services for each of the primary and secondary subscribers in accordance with the contract. Enabling the wireless services includes distributing, via a network 130, data of the contract to other systems, such as a billing system 132, a rating system 134, and a technical provisioning system 136. The technical provisioning system 136 generally provides connectivity data for wireless network usage by mobile devices of each subscriber. The rating system 134 generally provides financial authorization and cost attribution information for service usage by mobile devices of each subscriber. The billing system 132 receives usage data with regard to mobile devices of each subscriber, such as from the rating system 134, and informs the rating system 134 when subscriber mobile device usage is authorized and unauthorized in view of contract details. The billing system 132 also may provide billing information with regard to the contract, such as when monthly billing is performed or pre-paid account value is added. Note that the network 130 over which data of the contract is distributed may be one or more networks, which may be the same as network 120 and one or more other networks.

In some embodiments of the system 100, the quotation module 104, order module 106, and contract instantiation module 108 may also be utilized by the primary subscriber and secondary subscribers to whom configuration permissions have been delegate to make service and service level changes with regard to the contract. In such instances, the quotation module 104 provide an ability to retrieve a current configuration, to make changes thereto, to receive an updated cost quotation, and to effectuate such changes via the order module 106 and the contract instantiation module 108.

FIG. 2 is a user interface 200 illustration, according to an example embodiment. The user interface 200 is an example of a user interface that may be used by a primary subscriber, or a secondary subscriber to whom configuration permissions have been delegated, to input and modify wireless services and service levels with regard to each of the primary and secondary subscribers.

The user interface 200 includes a presentation of details of a base plan 202 that may have been selected. Such a base plan may include a set of base services, service levels, pricing for the services and service levels, and other such information that may be shred amongst all of the primary subscriber and secondary subscribers. In some embodiments, if a change to the base plan is desired, a set of action buttons 210 within the user interface may include a "CHANGE BASE PLAN" action button. Selection of this action button may cause the user interface 200 to present, or another user interface to open which will present, a selectable listing of available base plans that can be chosen. Once a base plan is chosen, the user interface 200 will again be displayed.

The user interface 200 further includes a listing 204 of each of the primary subscriber and secondary subscribers. Subscribers may be added and removed through use of ADD SUBSCRIBER and REMOVE SUBSCRIBER action buttons included within the set of action buttons 210. Each subscriber in the list 204 includes a MEMBER_ID, NAME, MAIN_ACCOUNT, BACKUP_ACCOUNT_FOR, BACKUP_ACCOUNT, TEL_NUMBER, PERSONAL_CONFIG, FREE_MINUTES, and at least additional data with regard to at least other service offerings and service levels thereof that may be offered by a particular wireless service provider. The MEMBER_ID is a unique identifier of the particular subscriber and NAME is the subscriber's name. The MAIN_ACCOUNT is blank for the primary subscriber and for the secondary subscribers, includes a reference to the MEMBER_ID of that secondary subscriber's primary subscriber. For example, as illustrated, MEMBER_ID's 100079 and 100081 reference MAIN_ACCOUNT 78, which is shorthand for MEMBER_ID 100078. This indicates that the MEMBER_ID's 100079 and 100081 are secondary subscribers from the primary subscriber having MEMBER_ID 100078.

The BACKUP_ACCOUNT_FOR and BACKUP_ACCOUNT are with regard to which services are backed-up in the event of service usage overage and which subscriber the overage is to be attributed to or from which subscriber usage balance the overage usage is to be deducted. For example, the secondary subscriber having the MEMBER_ID 100079 has BACKUP_ACCOUNT_FOR services listed as voice, SMS and data services. No backup is provided for SMS services and as a result, when this secondary subscriber reaches its limit of SMS service usage, SMS service usage will not be allowed until a next billing or usage cycle or, if a prepaid subscriber, the subscriber's allotment is replenished. Voice overage is always allowed and the BACKUP_ACCOUNT is listed as 78, which again is shorthand for the primary subscriber having MEMBER_ID 100078. In this instance, voice overage will be attributed to the listed BACKUP_ACCOUNT and will be charged against allotted free minutes of the listed BACKUP_ACCOUNT, added to a post-paid account balance of the listed BACKUP_ACCOUNT, or deducted from a prepaid account balance of the listed BACKUP_ACCOUNT. Data overage for the secondary subscriber having the MEMBER_ID 100079 is also provided a backup. However, the BACKUP_ACCOUNT_FOR is only for use after 2:00 PM and the overage will be attributed to the primary subscriber having MEMBER_ID 100078 in a similar manner as voice overage.

With regard to the secondary subscriber having the MEMBER_ID, all wireless services are backed up by the primary subscriber having MEMBER_ID 100078. Conversely, another secondary subscriber may not have a backup account for any services. Additionally, a secondary subscriber need not be backed up only by a primary subscriber. Instead, one secondary subscriber may be backed up by another secondary subscriber. Also, in an instance of backup where first subscriber provides backup to second subscriber for a particular service and the first subscriber has already consumed all allotted usage of that particular service, the second subscriber will not be backed up. However, these backup rules can be flexibly set in some embodiments to allow for multiple backups, multi-layered backups, and other backup arrangement than those already illustrated and described.

The TEL_NUMBER of each subscriber is just that—a telephone number of a mobile device associated with the subscriber. The PERSONAL_CONFIG of each subscriber is an option selectable by the primary subscriber to allow the respective secondary subscriber to personally configure the subscriber's services, service levels, and other subscriber related data. Another option may be provided in some embodiments to allow the primary subscriber to provide one or more secondary subscribers with configuration abilities of the primary subscriber, such as a secondary subscriber that is a spouse of the primary subscriber, as discussed above.

The FREE_MINUTES of each subscriber is illustrated as a drop-down list box 206 that provides options to select. The FREE_MINUTES are generally a number of voice minutes the respective subscribers are to be allotted and a cost associated therewith, if any. Similar selectable options may be provided with regard to other services not illustrated in the listing 204, such as a number of SMS messages allotted per month, an amount of data usage allowed, and the like. Additionally, with regard to the BACKUP_ACCOUNT_FOR and BACKUP_ACCOUNT for each subscriber, user interface controls may be provided to allow input of data and selection of options.

Once the primary subscriber, or authorized secondary subscriber, has finished entering or modifying data within the user interface 200, an ACCEPT action button from the set of action buttons 210 can be selected to cause a quotation, which may also include a summary of the data from the user interface 200, to be generated and presented. A CANCEL action button may also be included in the set of action buttons 210 to cause data changes within the user interface 200 to be discarded.

Figure 3:
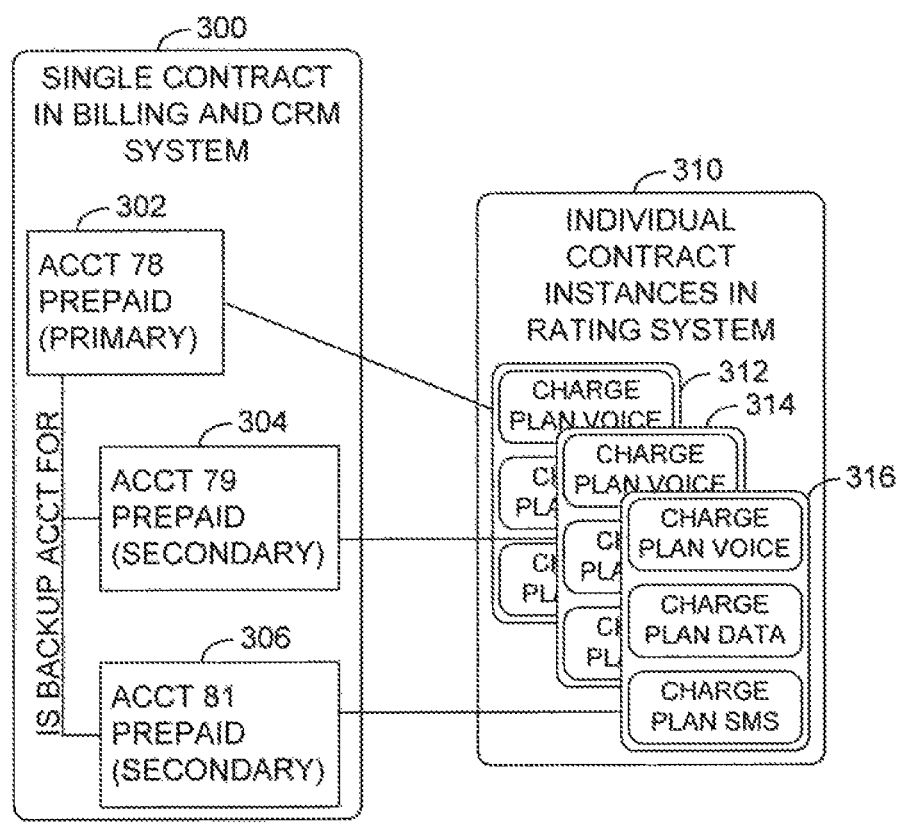
FIG. 3 is a data relationship illustration, according to an example embodiment.

FIG. 3 is a data relationship illustration, according to an example embodiment. The data relationship illustration of FIG. 3 provides a view of how a contract is instantiated within a billing system and CRM system as a single contract, but within a rating system as separate contracts for each of the subscribers. For example, the single contract 300 in the billing system has a primary subscriber 302 and two secondary subscribers 304, 306. However, each subscribers 302, 304, 306 is represented as having their own distinct contracts 312, 314, 316 within the rating system records 310. While the single contract 300 in the billing system and the CRM system may be a single data structure shared by both, other embodiments may include a copy of the single contract 300 in each of the billing system and the CRM system. In yet further embodiments, the billing system may be a portion of or module within the CRM system.

Figure 4:
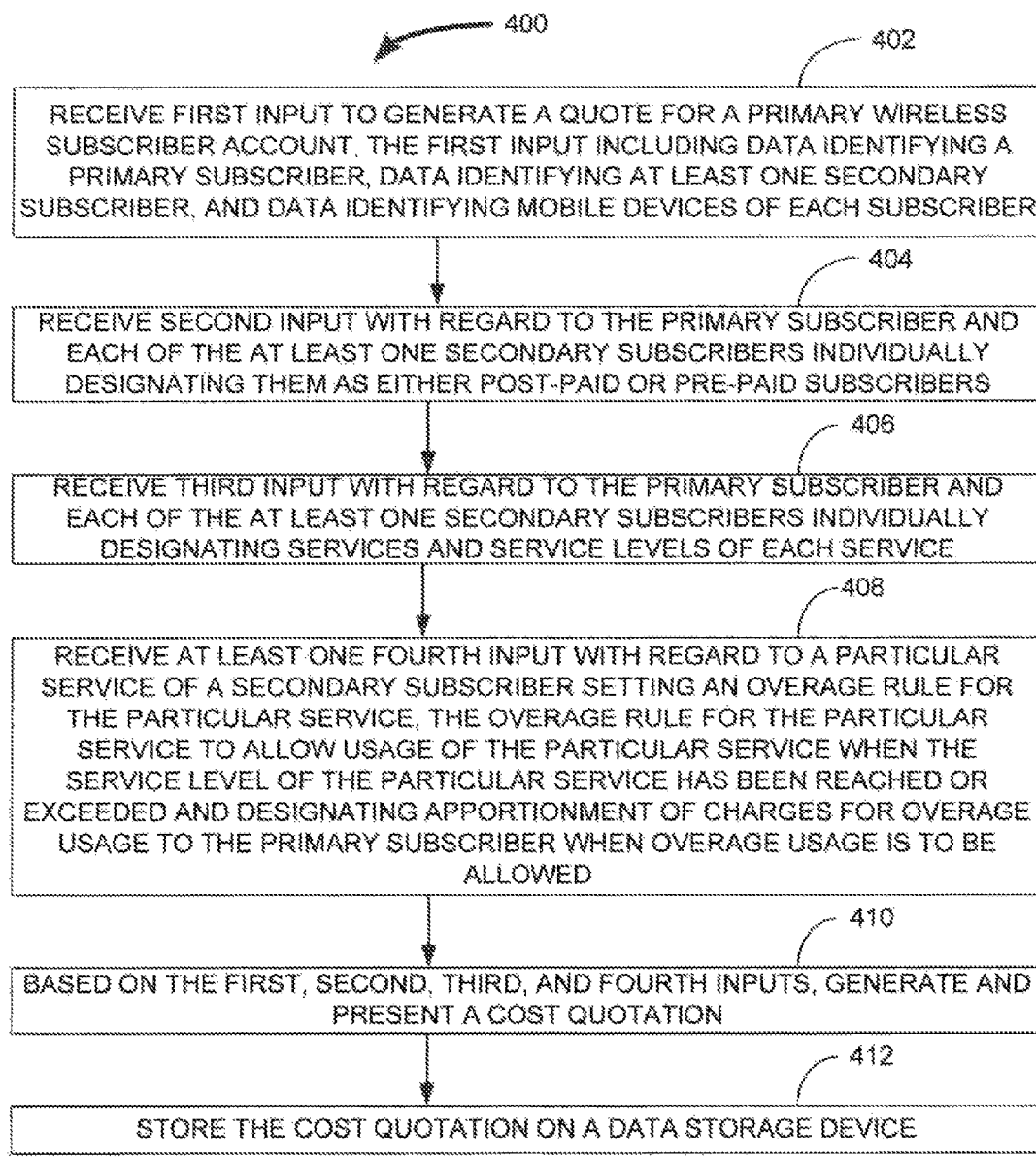
FIG. 4 is a block flow diagram of a method, according to an example embodiment.

FIG. 4 is a block flow diagram of a method 400, according to an example embodiment. The method 400 is an example of a method that may be performed by the quotation module 104 of FIG. 1 or by another process executed by at least one processor of at least one computing device to receive information from a primary subscriber with regard to wireless services. The method 400 may be executed based on the wireless service input to generate a cost quotation in furtherance of receiving an order for wireless services and effectuating such an order within a wireless service system.

In some embodiments, the method 400 includes receiving 402 first input including data identifying a primary subscriber, data identifying at least one secondary subscriber, and data identifying mobile devices of each subscriber. The method 400 further includes receiving 404, 406 second and third inputs, the second input with regard to the primary subscriber and each of the at least one secondary subscribers individually designating them as either post-paid or pre-paid subscribers and the third input individually designating service levels of each service for each of the primary subscriber and the secondary subscribers.

At least one fourth input may also be received 408 with regard to a particular service of a secondary subscriber setting an overage rule for the particular service. The overage rule for the particular service of a particular secondary subscriber may allow usage of the particular service when the service level of the particular service has been reached or exceeded and designating apportionment of charges for overage usage to the primary subscriber when overage usage is to be allowed. The method 400 may then, based on the first, second, third, and fourth inputs, generate and present 410 a cost quotation, which may then be stored 412 on a data storage device.

In some embodiments of the method 400, the first, second, third, and fourth inputs are received via a network from inputs received within a user interface generated at least in part based on user interface definition data provided via the network by a system performing the method 400. For example, the system performing the method 400 may be interacted with by a primary subscriber via a web browser over the Internet. In such embodiments, the web application server may interact with a backend system, which may be a CRM system or other enterprise-class computing system to obtain and store data and the web application server provides user interface definition data along with data obtained from the backend system in a markup language renderable to a user within a web browser application. Similarly, a primary subscriber may interact with the system performing the method 400 via an app, such as a non-web browser app, that executes on a mobile device of the primary subscriber. The app in such embodiments may include limited user interfaces, instead relying on user interface definition data received from a web server, web application server, or other server process.

Following the generating and presenting 410 of the cost quotation, an order input may be received with regard to the cost quotation from the primary subscriber to begin wireless service according to the cost quotation. Processing of an order input, according to some embodiments, is illustrated and described with regard to FIG. 5.

Figure 5:
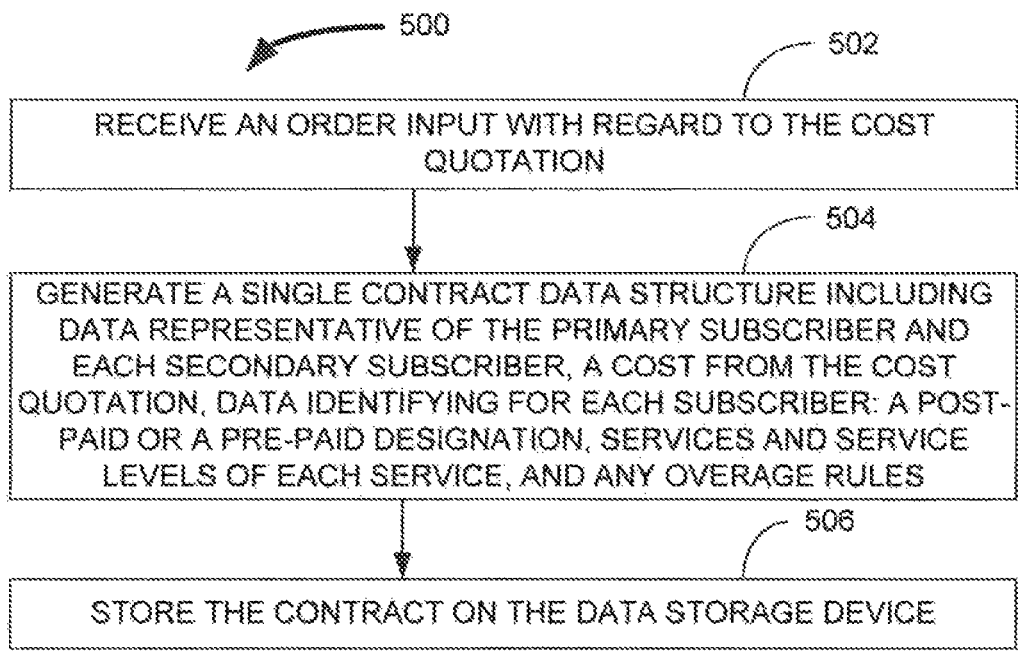
FIG. 5 is a block flow diagram of a method, according to an example embodiment.

FIG. 5 is a block flow diagram of a method 500, according to an example embodiment. The method 500 is an example of how an order input is processed, such as by the order module 106 of FIG. 1, to initiate wireless service in accordance with a cost quotation, as may be generated and provided according to the method 400 of FIG. 4.

The method 500 includes receiving 502 an order input with regard to the cost quotation, such as may be input by a primary subscriber via a web-based system, an interactive voice response system, a mobile device app, or other software system or by a customer service representative. Based on the received 502 order input, the method 500 further includes generating 504 a single contract data structure including data representative of the primary subscriber and each secondary subscriber, a cost from the cost quotation. The single contract data may be an actual single data structure or a single set of related records forming a single data structure, although constituent portions of the single data structure may be stored separately. The single data contract structure further may include, data identifying for each subscriber, a post-paid or pre-paid designation, services and service levels of each service, and any overage rules, as previously discussed herein. The method 500 may then store 506 the contract on the data storage device.

Following generation 504 of the contract data structure, further data will be distributed based thereon. That data may be distributed by a contract instantiation module 108 or other process to effectuate activation of the contract. Such distribution of the contract may include distributing data of the contract to other systems including a billing system, a rating system, and a technical provisioning system, such as described previously herein. Distributing data of the contract to the billing system, in some embodiments, includes distributing data representative of the contract to be stored and processed by the billing system as a single contract. Further, distributing data representative of the contract to the rating system and to the technical provisioning system may include distributing data of the primary subscriber and each of the secondary subscribers to create individual instances of the contract for each of the subscribers.

After a contract is generated 504 and instantiated, a primary subscriber or authorized secondary subscriber may desire to make changes to the wireless service contract. In such instances, a system performing one or both of the methods 400, such as the CRM system 102, in response to a request from the primary subscriber or authorized secondary subscriber may retrieve and provide data representative of the stored contract. Then, further input with regard to the contract may be received, such as with regard to a particular secondary subscriber represented in the retrieved data. The further input may modify data of at least one of the first, second, third, and fourth inputs received with regard to the particular secondary subscriber, or even the primary subscriber, or all subscribers such as with regard to a base plan. Such input may include adding or removing one or more subscribers. Once suitable changes have been made, an update input may be received which results in updating of the stored contract. The updated contract may then be distributed to the billing system, rating system, and technical provisioning system as necessary in view of the particular updates that were made.

Figure 6:
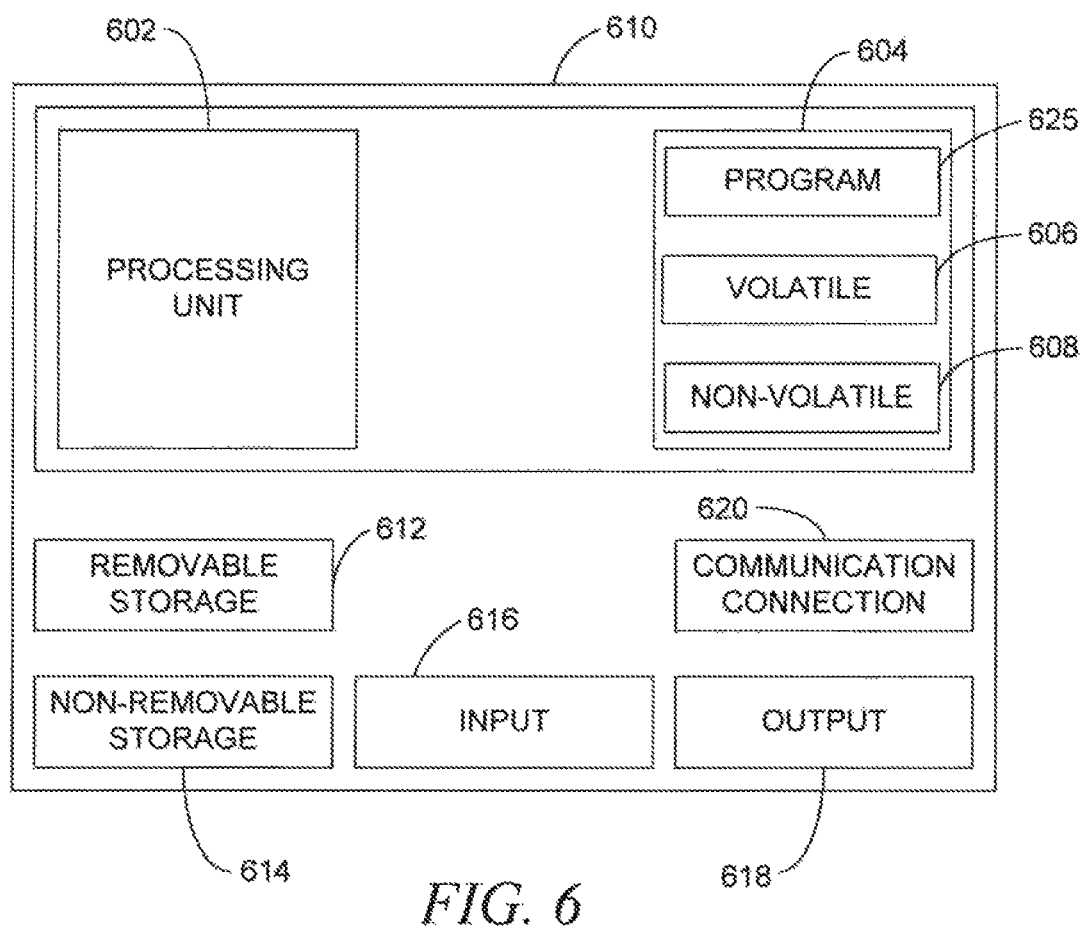
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example-computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 604. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, a computer program 625 capable of performing one or more of the methods, or portions thereof, as illustrated and described herein.

It will be readily understood to those skilled in the art that various other changes in the details material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving first input within a quotation module of a software system to generate a quote for a primary wireless subscriber account, the first input including data identifying a primary subscriber, data identifying at least one secondary subscriber, and data identifying mobile devices of each subscriber;
   receiving second input with regard to the primary subscriber and each of the at least one secondary subscribers individually designating them as either post-paid or pre-paid subscribers;
   receiving third input with regard to the primary subscriber and each of the at least one secondary subscribers individually designating services and service levels of each service;
   receiving at least one fourth input with regard to a particular service of a secondary subscriber setting an overage rule for the particular service, the overage rule for the particular service to allow usage of the particular service when the service level of the particular service has been reached or exceeded and designating apportionment of charges for overage usage to the primary subscriber when overage usage is to be allowed;
   based on the first, second, third, and fourth inputs, generating and presenting a cost quotation; and
   storing the cost quotation on a data storage device;
   receiving an order input with regard to the cost quotation;
   generating a single contract data structure having data comprising indicators of the primary subscriber and each secondary subscriber, a cost from the cost quotation, and service data for each subscribers;
   distributing data of the contract to other systems including a billing system, a rating system, and a technical provisioning system, the technical provisioning system providing connectivity data for wireless network usage by mobile devices of each subscriber, the rating system providing financial authorization and cost attribution information for service usage by mobile devices of each subscriber, and the billing system receiving usage data with regard to mobile devices of each subscriber,
   informing the rating system when subscriber mobile device usage is authorized and unauthorized in view of contract details, and providing billing information with regard to the contract; and
   wherein distributing data of the contract to:
   the billing system includes distributing data representative of the contract to be stored and processed by the billing system as a single contract; and
   the rating system and technical provisioning system includes distributing data of the primary subscriber and each of the secondary subscribers to create individual instances of the contract for each of the subscribers.

2. The method of claim 1, further comprising:
   retrieving and providing data representative of the stored contract in response to a request;
   receiving further input with regard to a particular secondary subscriber represented in the retrieved data, the further input modifying data of at least one of the first, second, third, and fourth inputs received with regard to the particular secondary subscriber;
   updating the stored contract in view of the further input; and
   distributing the update to the stored contract to at least one of the billing system, rating system, and technical provisioning system.

3. The method of claim 2, wherein the further input is input to remove the particular secondary subscriber from the contract.

4. The method of claim 1, wherein the first, second, third, and fourth inputs are received via a network from inputs received within a user interface generated at least in part based on user interface definition data provided via the network by a system performing the method.

5. The method of claim 4, wherein the user interface definition is a user interface definition renderable by a non-web browser app of a mobile device.

6. The method of claim 1, further comprising:
   receiving at least one fifth input with regard to a particular secondary subscriber setting a permission of the particular secondary subscriber to allow or prevent the particular secondary subscriber to modify the particular secondary subscriber's services, service levels of each service, and one or more overage rules.

7. A non-transitory computer-readable medium, with instructions stored thereon, which when executed by at least one processor of at least one computing device, cause the at least one computing device to:
   receive first input within a quotation module of a software system to generate a quote for a primary wireless subscriber account, the first input including data identifying a primary subscriber, data identifying at least one secondary subscriber, and data identifying mobile devices of each subscriber;
   receive second input with regard to the primary subscriber and each of the at least one secondary subscribers individually designating them as either post-paid or pre-paid subscribers;
   receive third input with regard to the primary subscriber and each of the at least one secondary subscribers individually designating services and service levels of each service;
   receive at least one fourth input with regard to a particular service of a secondary subscriber setting an overage rule for the particular service, the overage rule for the particular service to allow usage of the particular service when the service level of the particular service has been reached or exceeded and designating apportionment of charges for overage usage to the primary subscriber when overage usage is to be allowed;

based on the first, second, third, and fourth inputs, generate and present a cost quotation; and store the cost quotation on a data storage device;

receive an order input with regard to the cost quotation;

generate a single contract data structure having data to comprising indicators of the primary subscriber and each secondary subscriber, a cost from the cost quotation, and service data for each subscribers;

distribute data of the contract to other systems including a billing system, a rating system, and a technical provisioning system, the technical provisioning system providing connectivity data for wireless network usage by mobile devices of each subscriber, the rating system providing financial authorization and cost attribution information for service usage by mobile devices of each subscriber, and the billing system receiving usage data with regard to mobile devices of each subscriber, informing the rating system when subscriber mobile device usage is authorized and unauthorized in view of contract details, and providing billing information with regard to the contract; and wherein distributing data of the contract to:

the billing system includes distributing data representative of the contract to be stored and processed by the billing system as a single contract; and the rating system and technical provisioning system includes distributing data of the primary subscriber and each of the secondary subscribers to create individual instances of the contract for each of the subscribers.

8. The non-transitory computer-readable medium of claim 7, with further instructions stored thereon, which when executed by the at least one processor of the at least one computing device, further cause the at least one computing device to:

retrieve and provide data representative of the stored contract in response to a request;

receive further input with regard to a particular secondary subscriber represented in the retrieved data, the further input modifying data of at least one of the first, second, third, and fourth inputs received with regard to the particular secondary subscriber;

update the stored contract in view of the further input; and distribute the update to the stored contract to at least one of the billing system, rating system, and technical provisioning system.

9. The non-transitory computer-readable medium of claim 8, wherein the further input is input to remove the particular secondary subscriber from the contract.

10. The non-transitory computer-readable medium of claim 7, wherein the first, second, third, and fourth inputs are received via a network from inputs received within a user interface generated at least in part based on user interface definition data provided via the network by a system performing the method.

11. The non-transitory computer-readable medium of claim 10, wherein the user interface definition is a user interface definition renderable by a non-web browser app of a mobile device.

12. The non-transitory computer-readable medium of claim 7, with further instructions stored thereon, which when executed by the at least one processor of the at least one computing device, further cause the at least one computing device to:

receive at least one fifth input with regard to a particular secondary subscriber setting permission of the particular secondary subscriber to allow or prevent the particular secondary subscriber to modify the particular secondary subscriber's services, service levels of each service, and one or more overage rules.

13. A system comprising:

at least one processor, at least one memory device, and at least one network interface device; and a quotation module stored on the at least one memory device and executable by the at least one processor to cause the system to:

receive, via the at least one network interface device, first input to generate a quote for a primary wireless subscriber account, the first input including data identifying a primary subscriber, data identifying at least one secondary subscriber, and data identifying mobile devices of each subscriber;

receive, via the at least one network interface device, second input with regard to the primary subscriber and each of the at least one secondary subscribers individually designating them as either post-paid or pre-paid subscribers;

receive, via the at least one network interface device, third input with regard to the primary subscriber and each of the at least one secondary subscribers individually designating services and service levels of each service;

receive, via the at least one network interface device, at least one fourth input with regard to a particular service of a secondary subscriber setting an overage rule for the particular service, the overage rule for the particular service to allow usage of the particular service when the service level of the particular service has been reached or exceeded and designating apportionment of charges for overage usage to the primary subscriber when overage usage is to be allowed;

based on the first, second, third, and fourth inputs, generate a cost quotation and transmit a renderable representation of the cost quotation; and store the cost quotation on the at least one memory device;

an order module stored on the at least one memory device and executable by the at least one processor to:

receive, via the at least one network interface device, an order input with regard to the cost quotation;

in response to the order input, generate a single contract data structure having data comprising indicators of the primary subscriber and each secondary subscriber, a cost from the cost quotation, and service data for each subscribers;

a contract instantiation module stored on the at least one memory device and executable by the at least one processor to cause the system to:

distribute, via the at least one network interface device, data of the contract to other systems including a billing system, a rating system, and a technical provisioning system, the technical provisioning system providing connectivity data for wireless network usage by mobile devices of each subscriber, the rating system providing financial authorization and cost attribution information for service usage by mobile devices of each subscriber, and the billing system receiving usage data with regard to mobile devices of each subscriber, informing the rating system when subscriber mobile device usage is authorized and unauthorized in view of contract details, and providing billing information with regard to the contract; and wherein distributing data of the contract to:

the billing system includes distributing data representative of the contract to be stored and processed by the billing system as a single contract; and the rating system and technical provisioning system includes distributing data of the primary subscriber and each of the secondary subscribers to create individual instances of the contract for each of the subscribers.

14. The system of claim 13, wherein:

the quotation module is further executable by the at least one processor to:

retrieve and provide data representative of the stored contract in response to a request received via the at least one network interface device;

receive via the at least one network interface device, further input with regard to a particular secondary subscriber represented in the retrieved data, the further input modifying data of at least one of the first, second, third, and fourth inputs received with regard to the particular secondary subscriber; and store received modifications within the stored cost quotation on the at least one memory device;

the order module is further executable by the at least one processor to:

update the stored contract in view of the modifications to the cost quotation; and the contract instantiation module is further executable by the at least one processor to:

distribute, via the at least one network interface device, the update to the stored contract to at least one of the billing system, rating system, and technical provisioning system.

\* \* \* \* \*